United States Patent [19]

Galkiewicz

[11] Patent Number: 4,499,855

[45] Date of Patent: Feb. 19, 1985

[54] KITTY TEASE

[76] Inventor: John Galkiewicz, P.O. Box 120, Harrogate, Tenn. 37752

[21] Appl. No.: 524,420

[22] Filed: Aug. 18, 1983

[51] Int. Cl.³ .................................................. A01K 29/00
[52] U.S. Cl. ..................................... 119/29; 119/29.5
[58] Field of Search ............... 119/29, 29.5; 273/26 E, 273/58 C

[56] References Cited

U.S. PATENT DOCUMENTS

| | | | |
|---|---|---|---|
| 1,022,113 | 4/1912 | Smith | 119/29.5 |
| 1,265,926 | 5/1918 | Ludlam | 119/29.5 |
| 2,307,905 | 1/1943 | Ament | 119/29 |
| 2,833,244 | 5/1958 | Bohlman | 119/29 |
| 3,097,626 | 7/1963 | Felten | 119/29 |
| 3,731,925 | 5/1973 | Caldwell | 273/26 E |
| 4,079,934 | 3/1978 | Nixon | 273/26 E X |

*Primary Examiner*—Hugh R. Chamblee
*Attorney, Agent, or Firm*—Pitts and Brittian

[57] ABSTRACT

An entertaining and exercising toy which is manipulated by a human operator, and is for exercising a small animal such as a cat or kitten is disclosed. The apparatus comprises a handle (14) to which there is attached a rod (20) tapering from a base end (18) to an attaching end (22). The tapering of the rod (20) is such that the rod has increased flexibility from the base end (18) to the attaching end (22). Attached at attaching end (22) is a non-stretchable cord (26). The other end of non-stretchable cord (26) includes a target member (28) which may be a soft ball (30), a brightly colored ribbon (38), or a soft sculptured mouse (40). No matter what type of target member (28) is used, however, the target member will include a covering or material suitable for grasping or gripping by the claws of a cat or kitten such that the cat or kitten may pull thereon. In play, the target member may be dangled in front of the cat or kitten so as to attract the attention of the animal which will then grasp the target member (28) pulling thereon until the rod (20) bends and eventually springs away.

16 Claims, 6 Drawing Figures

KITTY TEASE

DESCRIPTION

1. Technical Field

This invention relates generally to an entertaining and exercising toy for use by small animals and more particularly to such a toy for attracting and maintaining the attention of an animal such as a cat or kitten for long periods of time. The toy is so designed that it can be attacked by the kitten in a playful manner without concern of injury to the claws of the animal and without injury to the toy itself. In addition, the spring action of the flexible rod has the ability to infuriate the kitten when the target member escapes so that the kitten can be entertained until it is exhausted.

2. Background Art

It will be appreciated by those skilled in the art, cats and kittens have provided pleasure for individuals for years and are specifically noted for their playful habits with such things as balls, yarn, butterflies and the like. To this end, there have been several attempts to provide toys for entertaining the animal which are capable of maintaining the attention of the animal, provide substantial exercise for the animal and yet are not harmful. As an example, U.S. Pat. No. 3,097,629 issued to M. Felten on July 16, 1963, discloses a toy for a cat which uses a very flexible spring as a center support mast such that when the cat or kitten graps the play object the string is pulled over toward the animal. Upon the cat or kitten releasing the play object, the spring moves back to its center upright position. In a somewhat similar manner, U.S. Pat. No. 2,833,244 issued to W. H. Bohlman on May 6, 1958, includes a toy which has a weighted base within a hemispherical floor contact surface member. In this toy, when the play object is grasped by the animal or cat, the center mast tends to tilt in the direction of the pull by the animal. When released, the mast rolls back to its center position taking the play object away from the animal.

Also U.S. Pat. No. 3,295,499 issued to J. T. Manchester on Jan. 3, 1967, provides a toy with a spring action by the use of a stretchable cord. That is, the play object is attached to a mast by a cord such as a rubber band. In addition, this patent includes a cross-member extending from the vertical mast and also a magnetic excape mechanism to ensure the string or cord holding the play object may be released from the mast to prevent injury in the event the animal gets the cord wrapped around its neck. However, as can be seen all of the above-mentioned toys do not incorporate the human operator who might be interested in playing and exercising with the cat or animal. Further, being an unattended toy, the toys disclosed to this point have extreme limitations upon their use and attractivness to the animal.

Accordingly, it is an object of the present invention to provide an inexpensive toy which will provide entertainment and excercise for a kitten or other small animal which is inexpensive to produce.

It is a further object of this invention to provide a toy which is strong and may be played with in a rough manner by the animal.

DISCLOSURE OF THE INVENTION

Other objects and advantages will be obvious, and will inpart appear hereinafter, and will be accomplished by the present invention which provides an entertaining and exercising toy which is manipulated by a human operator and is for use by a small animal such as a cat or kitten. The toy comprises an elongated handle member suitable for gripping by a human operator. The handle has a flexible rod attached to one of its ends and the flexible rod itself is tapered from the base end which is attached to the handle to an attaching end which includes a means for securing a cord or piece of string. In a perferred embodiment, the flexible rod is tapered from the base end to the attaching end such that the flexibility of the rod continuously increases from the base end to the attaching end. Attached to the attaching end of the rod is one end of a non-stretchable length of cord which has its other end attached to a target member. The target member is of a size and shape suitable for playing and batting or hitting by the paw of a kitten and the target member includes a material or cover such as cloth which is suitable for snagging and holding with the claws of a kitten. Thus, the kitten can snag or grasp the target member and pull thereon which causes the flexible rod to bend. Because of the flexibility, it will be appreciated that in the preferred embodiment, the rod member can be bent to almost double such that when the cat feels the tension on his claws and releases, the target member springs away so that the cat will then attack the member once again.

BRIEF DESCRIPTION OF THE DRAWINGS

The above-mentioned features of the present invention will be more clearly understood from consideration of the following description in connection with the accompanying drawing in which.

BEST MODE FOR CARRYING OUT THE INVENTION

Figure 1:
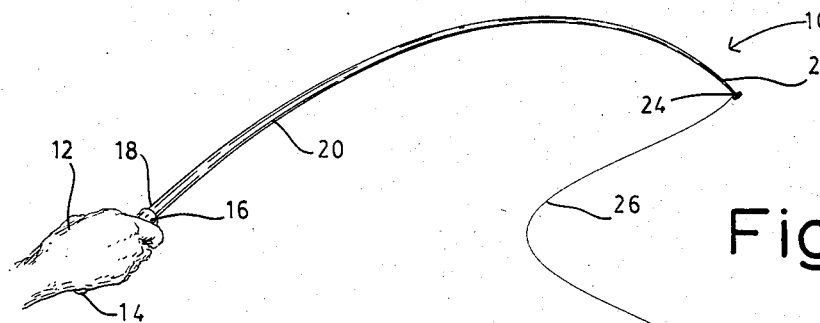
FIG. 1 is a perspective view showing the kitty tease toy of this invention handled by a human operator, and being attacked by a kitten.

Referring now to FIG. 1, there is shown generally at 10 the kitty tease or kitten toy of this invention. As shown, the hand 12 of a human operator is gripping the handle member 14 of the toy 10. Attached at one end 16 of the handle member 14 is a base end 18 of the rod member 20. Rod member 20 is substantially longer than the handle 14 and in a preferred embodiment it tapers from the base end 18 which is attached to end 16 of handle 14 to an apex or attaching end 22 of the flexible rod member 20. Attached to end 22 is an attaching means or tip 24 to which there is secured a cord 26. Cord 26 is a non-stretchable cord and may be made of any suitable material such as nylon, cotton, plastic or the like. Attached to the other end of cord 26 is a target member such as shown in FIG. 1 a brightly colored ribbon 28 which is grapped by the claws 30 of a kitten 32.

Figure 2:
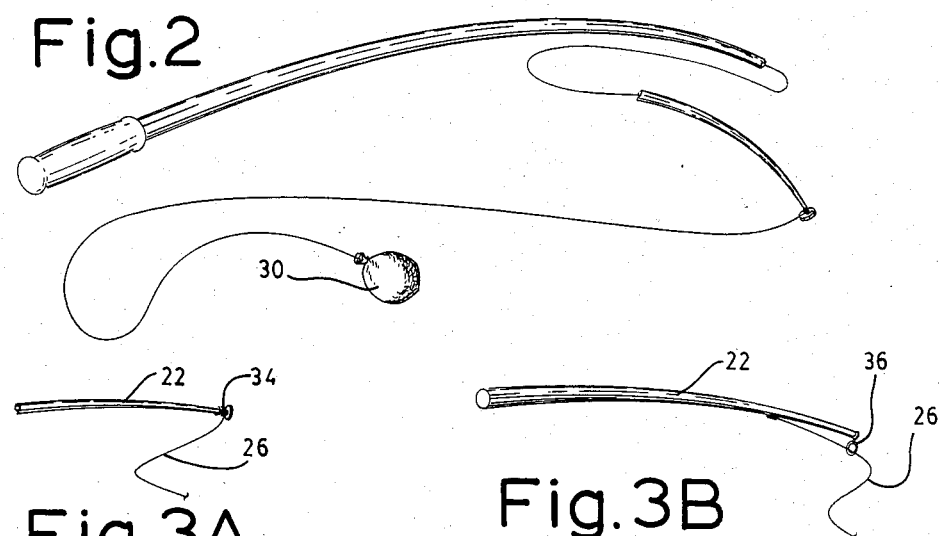
FIG. 2 shows a more detailed side view of the kitty tease toy of this invention.

It will be appreciated, of course, that although the FIG. 1 discloses the essentials of the toy of the present invention, FIG. 2 shows more details and in addition, shows the use of a target member 30, which in this case is a small soft sculptured bag which may include a scent such as cat nip included in the interior for further attracting the attention of the animal 32. Further, it will be appreciated that rod member 20 may be made of any strong yet flexible material such as plastic, fiberglass or the like.

Referring again to FIG. 1, because of the taper from the base end 18 to 22 of flexible rod 20, it will be appreciated that the rod has increased flexibility from the base end to the attaching end such that there is greater bending at the small end 22 than at the base end.

Figure 3A:
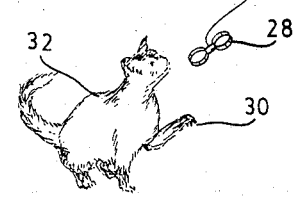
FIGS. 3A and 3B show two techniques for attaching a cord to the end of the flexible rod member of the toy of this invention.
Figure 3B:
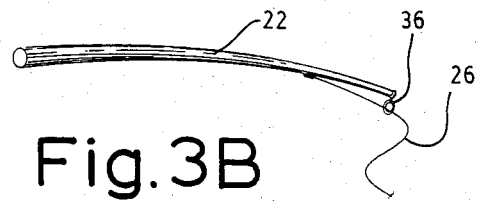

Referring now to FIGS. 3A and 3B, there is shown two different attaching ends for the small end of rod 22. As shown, in FIG. 3A, there is molded as an unitary piece therewith a button or enlarged portion 34 with a diameter greater than the diameter of the small end of the rod 22 and to which the string or cord is simply tied thereto. On the other hand, FIG. 3B shows attaching end 22 having secured thereto a metal eyelet 36 to which the cord 26 may be attached.

Figure 4A:
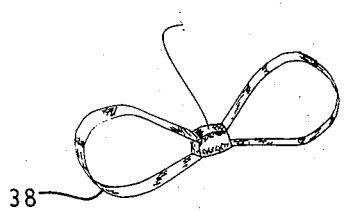
FIGS. 4A and 4B show two alternate embodiments of target members suitable for use with the toy of this invention.
Figure 4B:
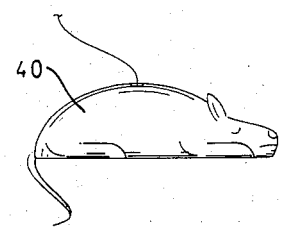

Also as is shown in FIGS. 4A and 4B, the target member may be a brightly colored ribbon 38 or could in fact be a soft sculpture or cloth mouse 40 or any other light-weight device suitable for batting by the kitten and also having a material such that the kitten can grap the target member with its claws and pull thereon.

Thus, although there has been described to this point particular embodiments of the present invention of an entertaining and exercising toy for a cat or kitten, it is not intended that such specific references be considered as limitations upon the scope of this invention except insofar as set forth in the following claims.

I claim:

1. An entertaining and exercising toy manipulated by a human operator for a small animal such as a kitten or cat comprising:
    an elongated handle member having a first end and a further end, said handle member suitable for gripping and manipulation by such human operator;
    a flexible rod member having a base end and an attaching end, said base end fixedly secured to said further end of said handle member, said rod member being substantially longer than said elongated handle and having a flexibility which varies in a selected manner between said base end and said attaching end;
    an attaching means fixedly secured to said attaching end of said rod member;
    a substantially non-stretchable length of cord having one end secured to said attaching means; and
    a target member attached to a further end of said length of cord, said target member being of a size and weight suitable for batting, said target member further having a cover material suitable for snagging or holding with the claws of such animal such that such animal can snag said target member and pull thereon causing said flexible rod to bend and thereby create resistance to movement of said target member by such animal for entertainment and exercise of such animal.

2. The toy of claim 1 wherein said flexible rod member is tapered from said base end at said handle member to an apex at said attaching end such that the flexibility of said rod member continuously increases from said base end to said apex.

3. The toy of claim 1 wherein said attaching means is a tip portion of said attaching end having a diameter greater than said attaching end and molded as a unitary piece therewith.

4. The toy of claim 1 wherein said attaching member is a metal eyelet secured to said attaching end.

5. The toy of claim 1 wherein said target member is a soft ball including a catnip scent.

6. The toy of claim 2 wherein said target member is a soft ball including a catnip scent.

7. The toy of claim 4 wherein said target member is a soft ball including a catnip scent.

8. The toy of claim 1 wherein said target member is a soft sculpture of a mouse.

9. The toy of claim 2 wherein said target member is a soft sculpture of a mouse.

10. The toy of claim 4 wherein said target member is a soft sculpture of a mouse.

11. The toy of claim 1 wherein said target member is a piece of brightly colored ribbon.

12. The toy of claim 2 wherein said target member is a piece of brightly colored ribbon.

13. The toy of claim 4 wherein said target member is a piece of brightly colored ribbon.

14. The toy of claim 1 wherein flexible rod is molded from a material selected from the group consisting of plastic and fiberglass.

15. An entertaining and exercising toy manipulated by a human operator for a kitten or small cat comprising:
    an elongated handle member having a first end and a further end, said handle member suitable for gripping and manipulation by such human operator;
    a flexible rod member, said flexible member tapering from a base end to an attaching end such that the flexibility of said rod member continuously increases from said base to said attaching end, said base end affixed to said first end of said handle member, said attaching end including a tip portion having a diameter greater than the diameter of said rod at said attaching end and molded as an unitary piece therewith, said rod member being substantially longer than said elongated handle;
    a substantially non-stretchable length of cord having one end secured to said attaching end of said flexible rod member; and
    a brightly colored target member attached to a further end of said length of cord, said brightly colored member being of a size and weight suitable for batting by the paws of such kitten, said target member further having a material suitable for snagging and holding with the claws of such kitten such that such kitten can snag said target member and pull thereon causing said flexible rod to bend and thereby create resistance to movement of said target member by such kitten and by movement of said handle by such human operator for entertaining and exercising such kitten.

16. A toy manipulated by a human operator for entertaining and exercising a small animal such as a kitten or cat, which comprises:
    an elongated handle member having a first end and a further end, said handle member having a length sufficient for grasp and manipulation by such operator;
    a flexible rod member having a base end secured to said first end of said handle member, and a further end, said rod member having a length substantially longer than said handle member and being tapered from said base end to said further end whereby the flexibility of said rod member continuously increases from said base end to said further end;

an attachment means at said further end of said rod member;
a substantially non-stretchable length of flexible cord having a first end attached to said attachment means, and a further end;
a target member attractive to such animal attached to said further end of said cord, said target member being of a size and weight suitable for batting by such animal, and having at least an exterior surface suitable for snagging or holding by claws of such animal whereby such animal can grasp said target member and pull thereon causing said rod member to bend and thereby create resistance to movement of said target member when pulled by such animal or when said handle is manipulated by such operator to provide entertainment and exercise of such animal.

* * * * *